US012141801B2

(12) United States Patent
Levionnais et al.

(10) Patent No.: US 12,141,801 B2
(45) Date of Patent: Nov. 12, 2024

(54) METHOD AND DEVICE FOR AUTHENTICATING A USER USING THE CONDUCTIVITY OF THE HUMAN BODY

(71) Applicant: Orange, Issy-les-Moulineaux (FR)

(72) Inventors: Philippe Michel Levionnais, Chatillon (FR); Olivier Lepetit, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 394 days.

(21) Appl. No.: 17/596,892

(22) PCT Filed: May 4, 2020

(86) PCT No.: PCT/EP2020/062288
§ 371 (c)(1),
(2) Date: Dec. 20, 2021

(87) PCT Pub. No.: WO2020/254026
PCT Pub. Date: Dec. 24, 2020

(65) Prior Publication Data
US 2022/0318800 A1 Oct. 6, 2022

(30) Foreign Application Priority Data

Jun. 20, 2019 (FR) ...................................... 1906690

(51) Int. Cl.
*G06Q 20/40* (2012.01)
*G06F 21/31* (2013.01)
(Continued)

(52) U.S. Cl.
CPC ............ *G06Q 20/40* (2013.01); *G06F 21/31* (2013.01); *H04W 4/80* (2018.02); *H04W 12/06* (2013.01)

(58) Field of Classification Search
CPC ..................................................... H04W 4/80
See application file for complete search history.

(56) References Cited

U.S. PATENT DOCUMENTS 11,074,325 B1\* 7/2021 Duke .................... H04L 63/102
2007/0177770 A1\* 8/2007 Derchak ............... A61B 5/7267
382/115
(Continued)

FOREIGN PATENT DOCUMENTS

EP 3428867 A1 1/2019
FR 2992442 A1 12/2013
(Continued)

OTHER PUBLICATIONS

E. C. Zungia et al., "Designing a complementary system of authentication base on galvanic body communication," 2016 IEEE Andescon, Arequipa, Peru, 2016, pp. 1-4 (Year: 2016).\*
(Continued)

*Primary Examiner* — Clayton R Williams
(74) *Attorney, Agent, or Firm* — Knobbe, Martens, Olson & Bear, LLP

(57) ABSTRACT

A method for controlling the authentication of a user by an authentication device, the authentication being implemented by verification, by the authentication device, that a code entered by the user on an interaction interface of the authentication device corresponds to a predetermined code associated with the user is disclosed. A signal representative of a radio signal characteristic of an interaction of the user on the interaction interface of the authentication device is received by the user's terminal. The radio signal is transmitted by an antenna of the authentication device via a channel using electromagnetic wave conduction capacities of the user's body when the user enters the code. It is verified that the radio signal corresponds to a previously stored reference signal, and, in the event of a positive verification, a piece of data representative of the user's identity is transmitted to the authentication device for verification with the user's identity.

16 Claims, 5 Drawing Sheets

(51) Int. Cl.
*H04W 4/80* (2018.01)
*H04W 12/06* (2021.01)

(56) References Cited

U.S. PATENT DOCUMENTS

| | | | | |
|---|---|---|---|---|
| 2008/0164999 A1* | 7/2008 | Otto | ............... | G16H 40/63 |
| | | | | 340/540 |
| 2013/0173926 A1* | 7/2013 | Morese | ............ | G16B 99/00 |
| | | | | 713/186 |
| 2017/0262622 A1 | 9/2017 | Abrams | | |
| 2019/0095926 A1* | 3/2019 | Li | ............... | G06Q 20/385 |

FOREIGN PATENT DOCUMENTS

| | | | |
|---|---|---|---|
| WO | WO 2016/089445 A1 | 6/2016 | |
| WO | WO 2017/093639 A1 | 6/2017 | |

OTHER PUBLICATIONS

International Search Report for International Application No. PCT/EP2020/062288, mailed on May 29, 2020.

\* cited by examiner

METHOD AND DEVICE FOR AUTHENTICATING A USER USING THE CONDUCTIVITY OF THE HUMAN BODY

CROSS-REFERENCE TO RELATED APPLICATIONS

This application is filed under 35 U.S.C. § 371 as the U.S. National Phase of Application No. PCT/EP2020/062288 entitled "METHOD AND DEVICE FOR AUTHENTICATING A USER USING THE CONDUCTIVITY OF THE HUMAN BODY" and filed May 4, 2020, and which claims priority to FR 1906690 filed Jun. 20, 2019, each of which is incorporated by reference in its entirety.

BACKGROUND

Field

The development relates to the authentication of a user, via communications initiated over a short-range wireless channel. More specifically, the development relates to a method for authenticating a user with an application or a device, via a portable terminal of the user capable of establishing a communication using the conductivity capacity of the human body to transmit the electromagnetic waves carrying such wireless communications.

Description of the Related Technology

There are mechanisms for authenticating a user to allow him to access a service, an application or carry out a payment transaction, for example.

For example, during a payment transaction, a user inserts his payment card into an electronic payment terminal (EPT) and enters a confidential code on the keypad of the EPT, generally a 4-digit code. The payment transaction is authorised when it is verified that the user has entered the correct confidential code. However, nothing prevents a malicious person from spying on the user when he enters his confidential code, and steals his bank card.

According to another example, a similar mechanism exists for unlocking a SIM (for Subscriber Identity Module) card or the screen of a smartphone. According to this example, the user enters a confidential code to unlock the SIM card or else enters a confidential pattern on the touch screen of the smartphone to unlock the screen of the smartphone. According to this example, nothing prevents a malicious user from spying on the user with his smartphone and stealing his smartphone.

There is therefore a need to improve the prior art.

SUMMARY OF CERTAIN INVENTIVE ASPECTS

The development improves the prior art. For this purpose, it relates to a method for controlling the authentication of a user by an authentication device, implemented by a processor. The authentication of the user with said authentication device is implemented at least by a verification, by the authentication device, that a code entered by the user on an interaction interface of the authentication device corresponds to a predetermined code associated with the user. The authentication control method comprises:

receiving a signal representative of at least one radio signal characteristic of at least one interaction of the user on the interaction interface of the authentication device, said radio signal being emitted by an antenna of the authentication device, to a terminal, via a channel using electromagnetic wave conduction capacities of the user's body when said user enters said code, verifying that said at least one radio signal corresponds to a previously stored reference signal, in the event of a positive verification, transmitting to said authentication device a piece of data representative of the identity of the user.

Advantageously, when the user interacts with the authentication device to authenticate himself therewith, for example when he enters a confidential code on an EPT, a radio carrier wave, or electromagnetic signal, is transmitted by the authentication device through the body of the user to a terminal, for example a terminal of the user such as a mobile telephone, adapted to receive such a signal.

Such a signal is characteristic of the interaction made by the user on the interaction interface of the authentication device. Indeed, when the user interacts on the interface, for example a numeric keypad and enters a code, his finger(s) contact the interface of the authentication device and move to different points of the interface when entering the code requires several contact points of the user on the interface (several keystrokes in the case of a multi-digit code). This creates variations in the electromagnetic field picked up by the terminal. The amplitude of the signal received by the terminal is thus modified according to the way in which the user interacts on the authentication device. The received radio signal is thus representative of the user's interaction with the authentication device when he enters his code.

In addition, the form of the signal transmitted via the user's body and picked up by the terminal also depends on a certain number of features specific to the wearer (body size, age, sex, tissue humidity, etc.), as well as reception means of the terminal (features and position of the antenna, etc.). The analysis of such a signal (shape, power, etc.) therefore allows to identify features specific to the user and to the interactions of the user on the authentication device and therefore to recognise it by comparison with a similar signal known.

The reference signal may for example correspond to a signal representative of a set of interactions performed by the user on the authentication device or on a similar device during an initialisation phase. Such a reference signal can thus be interpreted as a biometric signature of the user.

If another user takes ownership of the terminal, he does not have the same biometric features, and the interactions performed by this other user on the interface of the authentication device will generate a different signal. Thus, even though the other user would have knowledge of the code to be entered in order to authenticate himself with the device instead of the first user, this other user should in addition imitate the way in which the first user enters his code on the interface.

In addition, even if this other user knows the confidential code and imitates the way in which the first user enters it, this other user will be betrayed by its intrinsic component.

The method described above thus allows to provide a more secure authentication of the user by reinforcing an authentication by entering a code by a biometric signature associated with the entry of the code. This second verification of the user's identity is completely transparent for the user since it does not require interactions of the user other than those necessary for entering his code.

The code entered by the user and to be verified by the authentication device may correspond to any code capable of being entered on an adapted interface of the authentication device. For example, it may be a code with digits to be entered on a numeric keypad of an EPT, or of an automatic distributor, or an alphanumeric code to be entered on a keypad, or a touch interface, or else a visual code to be reproduced (for example an unlocking pattern) by interactions of the user defining one or more points of contact at one or more determined locations of the interface and in a predetermined order.

According to a particular embodiment of the development, the reference signal is represented by a quadruplet of previously stored reference signals, the verification that said at least one radio signal corresponds to a previously stored reference signal comprises:

obtaining a derivative signal of said at least one radio signal, verifying that said at least one radio signal is comprised within a first reference interval determined from two reference signals of said quadruplet of reference signals, and that said derivative signal is comprised within a second reference interval determined from the other two reference signals of said quadruplet of reference signals.

According to another particular embodiment of the development, the verification that said at least one radio signal is comprised within a first reference interval determined from two reference signals of said quadruplet of reference signals, and that said derivative signal is comprised within a second reference interval determined from the other two reference signals of said quadruplet of reference signals, comprising:

determining, for each signal to be verified, an indicator indicating whether said signal is comprised within the first reference interval or within the second reference interval, the indicator taking the value 0 when said signal is comprised within the first reference interval or within the second reference interval and the indicator taking the value 1 when said signal is not comprised within the first reference interval or within the second reference interval, calculating a sum of said indicators, comparing said sum with a reference threshold, the verification being positive when said sum is less than said reference threshold.

Alternatively, the reference threshold depends on a criterion of severity of the authentication.

According to another particular embodiment of the development, the interval of reference signals is obtained from an average and a standard deviation of radio signals characteristic of interactions of the user on an interaction interface of a device carried out during an initialisation phase.

According to this particular embodiment of the development, the biometric reference of the user takes into account the variability of the user when he enters his code, in particular the variability given by the different presses of the user on the interface of the device.

According to another particular embodiment of the development, the authentication device corresponds to the user's terminal.

According to this particular embodiment of the development, the authentication control method allows to reinforce the user's access to his mobile terminal. For example, when the user enters his code on the terminal, it verifies that the code entered is the correct one and also verifies that the user who entered the code is indeed the one for which the reference signal was stored.

This particular embodiment of the development can be used to reinforce the security of unlocking the terminal, or else the security of payment transactions carried out directly by means of a mobile terminal.

According to another particular embodiment of the development, the authentication device corresponds to a payment terminal.

According to another particular embodiment of the development, the reference signal is associated with an identifier of the user.

This particular embodiment of the development allows to take into account the case where the code to be entered for authentication can be used by several users, for example in the case of a bank card shared by a family.

The development also relates to a method for authenticating a user, implemented by an authentication device, comprising:

verifying that a code entered by the user on an interaction interface of the authentication device corresponds to a predetermined code associated with the user, emitting a signal representative of at least one radio signal characteristic of at least one interaction of the user on the interaction interface of the authentication device, said radio signal being emitted by an antenna of the authentication device, to a user's terminal, via a channel using electromagnetic wave conduction capacities of the user's body when said user enters said code, receiving a piece of data representative of the identity of the user from the user's terminal, verifying that the identity of the user corresponds to an identity associated with the predetermined code associated with the user.

The authentication method thus allows to secure the authentications of the users by entering a confidential code while ensuring a double verification. It is thus verified that the code entered by the user is correct and that the identity of the user who composed the code does indeed correspond to an identity associated with the code.

According to a particular embodiment of the development, the verification that the identity of the user corresponds to an identity associated with the predetermined code associated with the user comprises:

transmitting to a control device the piece of data representative of the identity of the user received and a second piece of data representative of the identity of the user, said second piece of data being associated with the predetermined code, receiving a signal validating the identity of the user.

According to this particular embodiment, the verification of the identity of the user is implemented by a control device, for example a banking server, to which the pieces of data representative of the identity of the user are sent. For example, the piece of data representative of the identity of the user received from the user's terminal may correspond to a mobile number of the user's terminal and the second piece of data representative of the identity of the user may correspond to a name associated with the predetermined code. For example, the predetermined code, as well as the second piece of data representative of the identity of the user are stored on a physical means, such as a bank card, or the like. This physical means being read by the authentication device to verify the code entered by the user.

The development also relates to a device for controlling the authentication of a user by an authentication device, the authentication of the user with said authentication device being implemented at least by a verification, by the authentication device, that a code entered by the user on an interaction interface of the authentication device corresponds to a predetermined code associated with the user.

The authentication control device comprises at least a memory and a processor configured for:

receiving a signal representative of at least one radio signal characteristic of at least one interaction of the user on the interaction interface of the authentication device, said radio signal being emitted by an antenna of the authentication device, to an authentication control device, via a channel using electromagnetic wave conduction capacities of the user's body when said user enters said code, verifying that said at least one radio signal corresponds to a previously stored reference signal, in the event of a positive verification, transmitting to said authentication device a piece of data representative of the identity of the user.

The development also relates to an authentication device comprising a memory and a processor configured for:

verifying that a code entered by the user on an interaction interface of the authentication device corresponds to a predetermined code associated with the user, emitting a signal representative of at least one radio signal characteristic of at least one interaction of the user on the interaction interface of the authentication device, said radio signal being emitted by an antenna of the authentication device, to a user's terminal, via a channel using electromagnetic wave conduction capacities of the user's body when said user enters said code, receiving a piece of data representative of the identity of the user from the user's terminal, verifying that the identity of the user corresponds to an identity associated with the predetermined code associated with the user.

According to a particular embodiment of the development, the authentication device described above is comprised in a payment terminal.

According to another particular embodiment of the development, the authentication device described above is comprised in a terminal, for example a mobile terminal, or tablet.

According to another particular embodiment of the development, the authentication device described above and the control device described above are comprised in a terminal.

The development also relates to a computer program including instructions for implementing the control method and/or the authentication method described above according to any one of the particular embodiments described above, when said program is executed by a processor. The methods can be implemented in various ways, in particular in wired form or in software form.

This program can use any programming language, and be in the form of source code, object code, or intermediate code between source code and object code, such as in a partially compiled form, or in any other desirable form.

The development also aims at a recording medium or information medium readable by a computer, and including instructions of a computer program as mentioned above. The aforementioned recording media can be any entity or device capable of storing the program. For example, the medium may include a storage means, such as a ROM, for example a CD ROM or a microelectronic circuit ROM, or else a magnetic recording means, for example a hard disk or a USB key. On the other hand, the recording media may correspond to a transmissible medium such as an electrical or optical signal, which can be conveyed via an electrical or optical cable, by radio or by other means. The programs according to the development can in particular be downloaded from an Internet type network.

Alternatively, the recording media may correspond to an integrated circuit wherein the program is incorporated, the circuit being adapted to execute or to be used in the execution of the method in question.

BRIEF DESCRIPTION OF THE DRAWINGS

Other features and advantages of the development will emerge more clearly upon reading the following description of particular embodiments, given by way of simple illustrative and non-limiting examples, and the appended drawings, among which.

DETAILED DESCRIPTION OF CERTAIN ILLUSTRATIVE EMBODIMENTS

General Principle of the Development

The general principle of the development is to use new wireless communication techniques using the human body as a channel to generate a signal representative of an interaction of the user, for example the entry of a confidential code, on a surface of an authentication device and received by a user's terminal. Using this generated signal and a reference signal learned beforehand for the user, it is possible to verify whether the signal received by the terminal is indeed characteristic of the user. It is thus possible to determine whether the user who interacts on the surface of the authentication device is indeed the user of the terminal. The development thus allows, for example, to define a new type of biometric signature.

Particular Embodiments of the Development

Over the past decades, new wireless communication techniques have emerged using the human body as a channel. In these technologies that are grouped under the generic term of IBC (for Intra-Body Communication) or BCC (for Body Channel Communication) or CBB (for Communication By Body), the human body acts like a conductor to transmit pieces of information from one point to another. Interest is particularly given here to methods based on induction coupling, also frequently called "near field methods" or NF (for Near Field), adapted for proximity communication. Near field communications are usually known by the acronym "NFC" (for "Near Field Communication"), based mainly on the standard ISO (International Standard Organisation) 14443, use wireless technologies to allow an exchange of pieces of information between two devices that are only a short distance away.

Figure 1A:
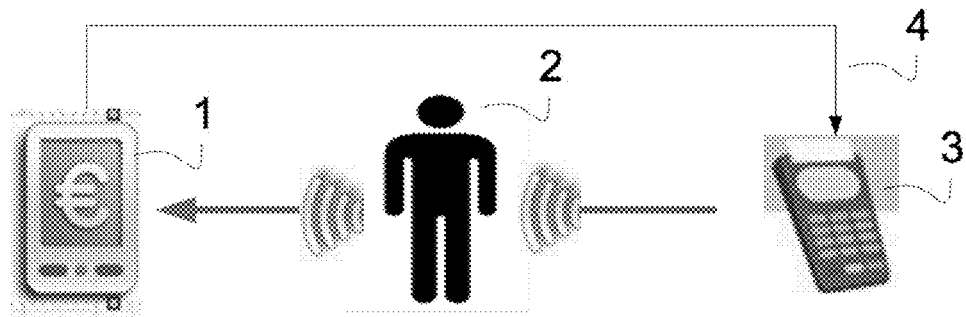
FIG. 1A illustrates an example of an environment for implementing the development according to one particular embodiment of the development.
Figure 1B:
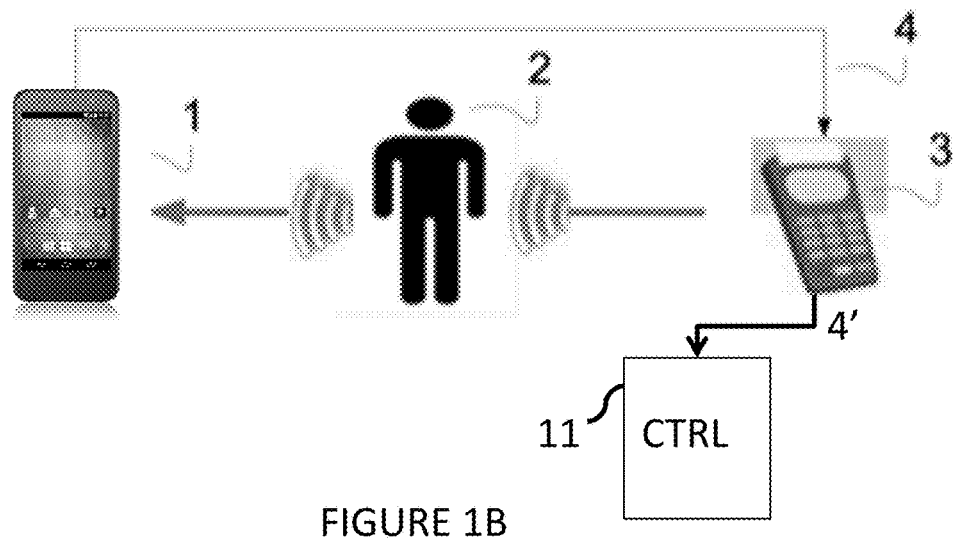
FIG. 1B illustrates an example of an environment for implementing the development according to another particular embodiment of the development.
Figure 1C:
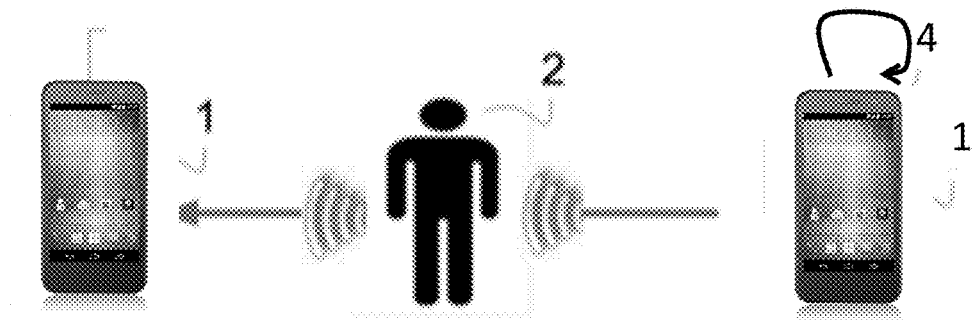
FIG. 1C illustrates an example of an environment for implementing the development according to another particular embodiment of the development.

FIGS. 1A, 1B, and 1C show a wireless communication system according to different embodiments of the development when a user (2) carrying a portable device (1), called hereinafter terminal, equipped with an NFC module, as defined previously, enters a code on an interaction interface of an authentication device (3), to authenticate himself with this device or with a service.

Service means any type of service, for example a monetary transaction, ticket validation, access to a secure location, unlocking of a terminal, etc.

The authentication device (3) can be for example a connected object (IOT for Internet Of Things), an EPT (for Electronic Payment Terminal), an access control terminal, a personal computer, a computer mouse, a home gateway, the user's terminal, etc. It is able to emit NFC-type radio signals, through the user's body, via an NFC/CBB antenna (not shown). In this exemplary embodiment, the authentication device (3) comprises a surface consisting of the antenna which is optionally protected and adapted to react when the user touches it or approximates it, for example by approaching his hand. The term "surface" is in no way limiting and given as an illustration, the antenna being the only means essential for the operation of the device. The assembly consisting of the antenna, the surface and more generally all the components necessary for the implementation of an IBC communication is hereinafter called "emitter IBC module", denoted MIBCM. Note that this module corresponds to the standard NFC module of an NFC type terminal configured for CBB communication by loading a specific program (software), without changing the hardware.

In the examples illustrated in FIGS. 1A and 1B, the authentication device (3) is an EPT comprising for example a user interface, also called HMI (for Human Machine Interface), comprising for example a screen intended to display messages to the user and a numeric keypad on which the user can enter a code.

The terminal (1) according to the development is a portable device naturally capable of receiving radio carrier waves, via an antenna, through the body of the user (2). To this end, the terminal (1) is located in the immediate vicinity of the user (2), without necessarily being in direct contact with said user. For example, the terminal (1) is placed inside a pocket or bag carried against the user. In these configurations, it is estimated that the terminal (1) is not more than a few centimetres away from the user's body (2). The distance is for example less than 5 cm. The terminal (1) is equipped with a battery or with cells, for an autonomous operation. According to this example, it is a mobile terminal equipped with an NFC antenna (not shown) adapted in CBB mode to receive the electrical signals modulated in the form of an electromagnetic wave through the user's body when the latter is located in the immediate vicinity of the emitter device.

In the example illustrated in FIG. 1C, the authentication device is comprised in the terminal (1) of the user.

According to the exemplary embodiments illustrated in FIGS. 1A, 1B, the terminal (1) moreover includes means for communicating on a second channel (4), for example Bluetooth or Wi-Fi. The use of such a channel (4) allows higher transmission bit rates and speeds than CBB. This allows the terminal (1) of the user to communicate with the authentication device (3), for example to transmit to the authentication device a piece of data representative of the identity of the user when it is verified by the terminal that the radio signal received from the authentication device via the user's body corresponds to a reference signal previously stored by the terminal (1).

According to the embodiment described in FIG. 1A, when the user enters a code on the interaction interface of the authentication device (3), for example a confidential code to validate a payment transaction, a radio signal characteristic of the user's interaction is transmitted to the terminal (1) via the user's body (2). The terminal (1) verifies whether the received radio signal corresponds to a reference signal previously stored by the terminal (1). In the event of a positive verification, the terminal (1) transmits to the authentication device (3) via the channel (4) a piece of data representative of the identity of the user. The authentication device can then verify on the one hand that the code entered by the user corresponds to a predetermined code, for example a confidential code stored on a secure medium inserted in the authentication device, for example an integrated circuit card, and on the other hand if the identity of the user transmitted by the terminal corresponds to the identity of the user associated with the predetermined code, for example such an identity is also stored on the secure medium.

FIG. 1B illustrates a variant of the embodiment illustrated in FIG. 1A. According to this variant, the authentication device (3) moreover includes means for communicating on another channel (4'), for example Bluetooth or Wi-Fi, or via a mobile or fixed data network. This allows the authentication device (3) to communicate with a control device (11), for example a bank server. Such a channel (4') allows for example the authentication device (3) to transmit the piece of data representative of the identity of the user received from the terminal (1) to the control device (11), as well as a second piece of identity data of the user associated with the predetermined code. According to this variant, the identity of the user is verified by the control device.

FIG. 1C illustrates another particular embodiment of the development, wherein the authentication device is comprised in the terminal (1). For example, this particular embodiment of the development allows to verify the identity of the user (2) when the latter enters a code on his terminal (1), for example a code for unlocking his SIM card or from his screen or to validate a bank transaction on his terminal.

According to another variant of the particular embodiment of the development illustrated in FIG. 1C, the terminal (1) is an EPT. According to this variant, the user enters his confidential code on the EPT that he is holding in his hand and the EPT verifies that the intra-body signal(s) emitted by the EPT, transmitted by the body of the user and received by the EPT corresponds to the user who entered the code. For this purpose, for example, the piece of data representative of the identity of the user and his biometric reference (reference signal associated with the user) are stored on an integrated circuit card and are read by the EPT at the time of the transaction. The EPT then verifies that the intra-body signal(s) received correspond to the user's reference stored on the integrated circuit card and that the code entered is the code associated with the identity of the user stored on the integrated circuit card.

According to any one of the examples described above, a phase of learning a reference signal associated with the user is necessary. Such a learning phase is described below in relation to FIG. 4.

A terminal device (1) according to the development will now be described in relation to FIG. 2. The terminal (1) is for example a mobile terminal of the smartphone type adapted for implementing the development. According to another variant, the terminal (1) is an EPT which id modified and able to receive an intra-body signal. According to another example, the terminal is a simple electronic card equipped with the following modules:

a processing unit, or "CPU" (for "Central Processing Unit"), intended to load instructions into memory, to execute them, to carry out operations;

a set M of memories, including a volatile memory, or "RAM" (for "Random Access Memory") used to execute code instructions, store variables, etc. and a non-volatile memory of the "ROM" (for "Read Only Memory"), or "EEPROM" (for "Electronically Erasable Programmable Read Only Memory") type intended to contain persistent pieces of information, in particular pieces of identification data of the user, for example a mobile number, an identifier, a confidential code, etc. According to one embodiment of the development, the memory M contains a memory area (5), which is preferably secure, containing pieces of authentication data of at least one user of the terminal.

a module called "User IBC Module", MIBCU, including:

a CBB antenna (ANT) adapted for receiving signals over the radio channel and via the human body, so that a modulated electrical signal transported by the user's body is capable of being received by the antenna, which is located in the terminal, in proximity to the human body;

a demodulator (DEMOD), intended to receive via the antenna a modulated electrical signal and to transform it into a digital signal intended to be transmitted to the processing unit;

the software components (firmware, etc.) necessary for the implementation of CBB communications;

a Bluetooth or WiFi type radio module (BT) intended in particular to transmit pieces of data back from the terminal to an authentication device.

preferably, and in particular if these modules are not implemented on another device:

a verification module DGV for analysing a signal received by the CBB module and determining whether the signal received corresponds to a reference signal stored beforehand, an application module APPV to validate or not the authentication of the user depending on whether the received signal corresponds to the reference signal or not, preferably, and in particular if this module is not implemented on another device, an application (APPA) intended for implementing a learning method according to embodiments of the development, in particular:

learning at least one piece of user authentication data;

accessing an authentication database (5) containing the reference signals of one or more potential users of the terminal.

Note that this learning module and this database are not necessarily located on the terminal: they can be located on a server in a data network, etc.

Figure 3:
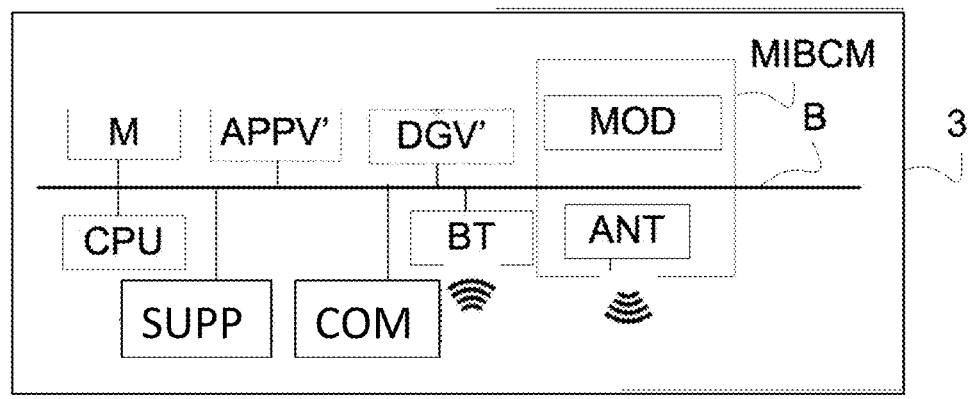
FIG. 3 shows an authentication device according to one embodiment of the development.

An authentication device (3) according to the development will now be described in relation to FIG. 3.

Figure 2:
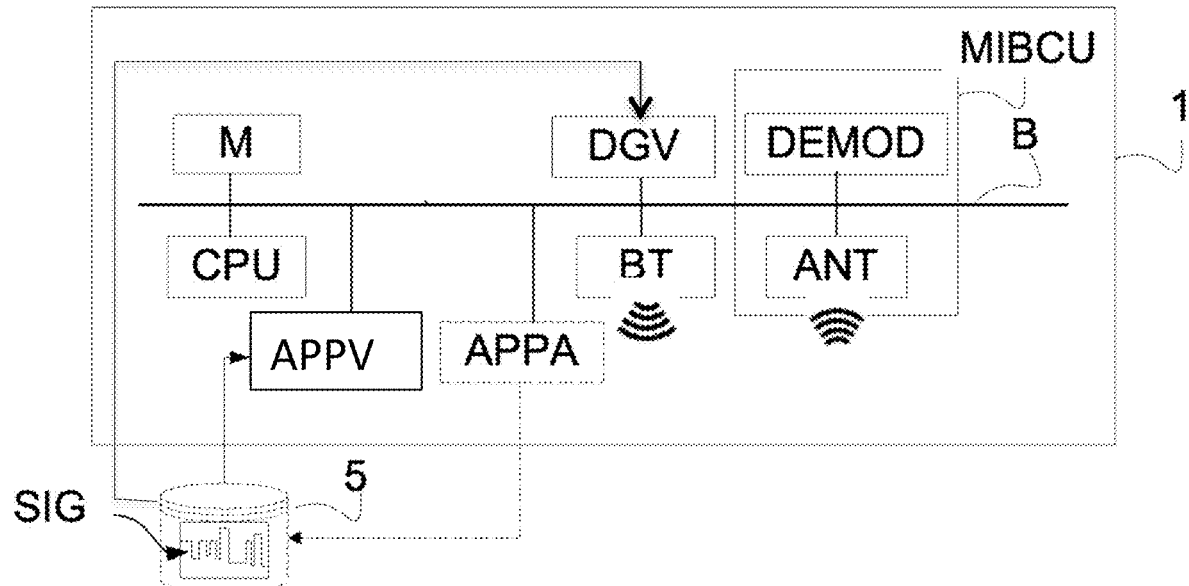
FIG. 2 shows a terminal according to one embodiment of the development.

The authentication device comprises several modules which are similar to those of the terminal 1 described in relation to FIG. 2:

a processing unit or "CPU", intended to load instructions into memory, to execute them, to carry out operations.

a set M of memories, including a volatile memory or "RAM" (for "Random Access Memory") used to execute code instructions, store variables, etc., and a non-volatile memory, of the "ROM" or "EEPROM" type intended to contain persistent pieces of information;

a module called "Emitter IBC module", MIBCM, including:

a CBB antenna (ANT) adapted for emitting signals over the radio channel and via the human body;

a modulator (MOD) intended to adapt a digital signal produced by the microprocessor into a modulated electrical signal, intended to be transmitted, via the antenna, through the user's body. The modulation operation performed by the modulator is for example an amplitude modulation: the signal is a 13.56 MHz signal modulated in amplitude with a modulation rate of about 10% (known feature of the type B according to the standard NFC). The development is not, however, limited to this type of modulation. In another exemplary embodiment, the modulation is a frequency modulation, less sensitive to interference, or phase modulation;

a contact surface, not shown, adapted to react to the immediate proximity of the user (contact, quasi-contact, touch, etc.). In the example described here, this surface corresponds to the antenna, so that a modulated electrical signal emitted via the antenna is able to be conveyed by the body of the user which is in the proximity of the surface. In an exemplary embodiment, the antenna can be integrated into the surface. The surface is arranged to cooperate with the processing unit to implement the steps of the method which will be described later;

a Bluetooth or Wi-Fi type radio module BT intended in particular to receive pieces of data from the user's terminal (piece of identity data transmitted by the terminal, pieces of data relating to a transaction, etc.) and/or to communicate with another device to validate a transaction.

the software components (firmware, etc.) necessary for the implementation of IBC communications.

a user interface (HMI), not shown, adapted for transmitting instructions or information messages to the user and for receiving interactions of the user. For example, the user interface comprises a screen on which messages and instructions are displayed and a separate or on-screen numeric keypad through which the user can enter a numeric code, for example.

a module SUPP for obtaining a predetermined code associated with the user, for example it may be an integrated reader of an integrated circuit card adapted for reading the pieces of information comprised in the memory of the integrated circuit card, or a communication interface adapted for receiving secure pieces of information transmitted by the terminal via a dematerialised bank card application, a verification module DGV' for analysing a signal corresponding to a code entered by the user on the user interface and verifying whether the code entered by the user corresponds to the predetermined code obtained by the obtaining module SUPP, an application module APPV' intended according to a variant embodiment to verify the identity of the user from a piece of identity data received from the user's terminal and a piece of identity data associated with the predetermined code obtained by the obtaining module SUPP. According to another variant, the application module APPV' is intended to cooperate with a communication module COM to transmit these two pieces of identity data to a control device. The application module APPV' cooperates with the module DGV' to validate the authentication of the user when, on the one hand, the code composed corresponds to the predetermined code and, on the other hand, the identity of the user who composed the code corresponds to the identity associated with the predetermined code, a communication module COM capable of transmitting pieces of identity data to a control device and receiving a signal for validating the identity of the user coming from the authentication device.

Figure 4:
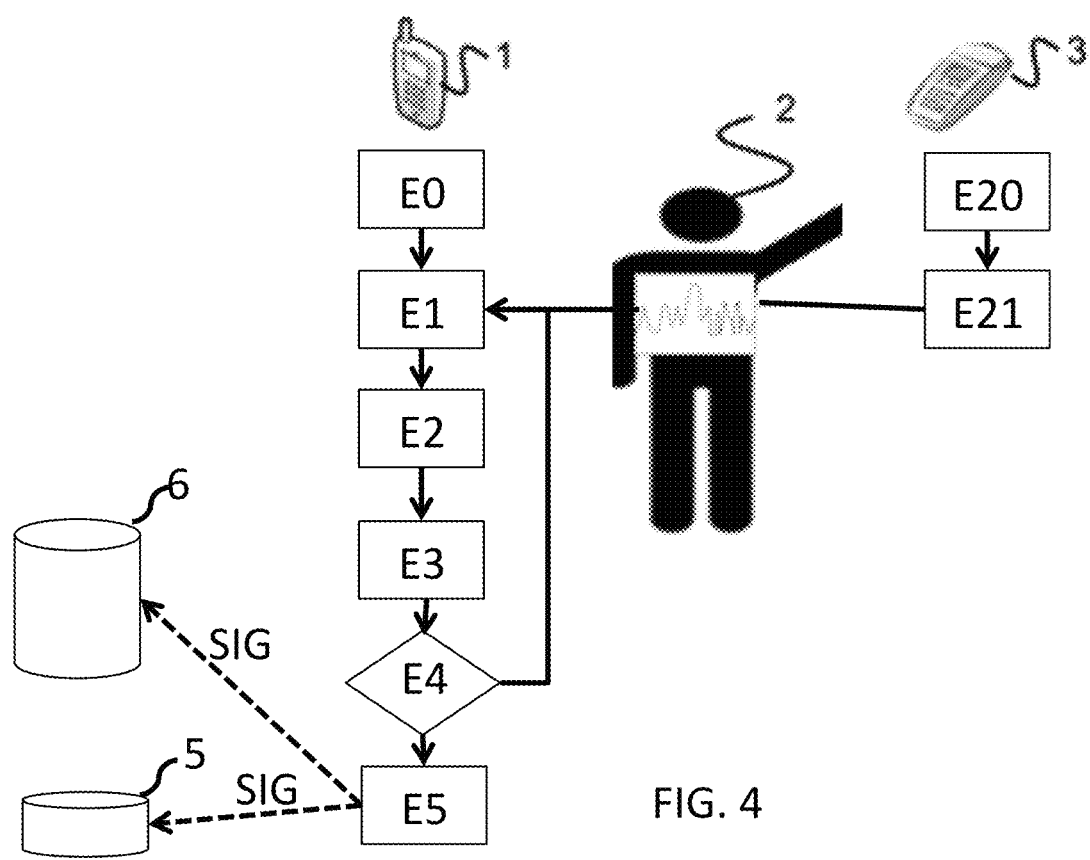
FIG. 4 shows the steps of a method for learning a reference signal from a user according to one embodiment of the development.

FIG. 4 shows the steps of a learning method according to one embodiment of the development.

Learning is achieved by placing the user's finger on each of the digits of an interaction interface of a learning device, for example the authentication device. The user is for example in a shop of a telecommunications operator and is about to create his reference signal which will be used subsequently to verify the authentication of the user, when using the CBB-type services.

According to this embodiment, the communication is unidirectional (in CBB mode), from the learning device to the user's terminal, and a Bluetooth communication channel (4) is used for communication from the user's terminal to the learning device. The user's terminal, for example of the CBB smartphone type, is in the user's pocket.

It is assumed here that all the requirements necessary for the CBB communication were carried out during the respective initialisation steps E0 and E20, as for example described in application WO2017/093639, in particular the broadcasting by the learning device of a prompt message optionally including parameters relating to the service offered (service identifier, hazard, which will in particular allow Bluetooth pairing, etc.), the positioning of the terminal in CBB reception mode, the launch of the learning program, etc.

In particular, during step E20, the user is asked to successively press each of the digits of a digital keypad of the learning device (terminal, EPT, etc.).

During a step E21, the user presses one of the digits of a numeric keypad of the learning device.

During a step E21, communication is established on the IBC channel. The terminal emits the signal $SP_i(t)$ transmitted via the user's body and carrying the features of the user when he interacts with the digit i. Such a signal $SP_i(t)$ is received by the terminal of the user (1) during a step E1.

During a step E2, the user's terminal demodulates and processes the received signal $SP_i(t)$.

During a step E3, the terminal stores the signal $SP_i(t)$ in a memory (shown here in the form of a database (6) by way of example). Alternatively, it can also transmit the signal, to an external learning server.

During a step E4, it is verified whether the 10 signals $SP_i(t)$, corresponding to the 10 digits of the digital keypad, have been received. If this is not the case, the method returns to step E1 waiting for a new signal $SP_i(t)$.

If this is the case, the method goes to step E5.

During step E5, reference signals are generated for the user from the 10 stored signals $SP_i(t)$. For this purpose, the terminal calculates the derivative $SP'_i(t)$ of each signal $SP_i(t)$. Then, for each instant t, the terminal calculates the average M(t) of the 10 signals $$SP_i(t) = \frac{\Sigma_i SP_i(t)}{N},$$

where N is the number of acquired signals $SP_i(t)$, here N=10. The terminal also calculates the standard deviation $$\sigma(t) = \sqrt{\frac{\Sigma_i (SP_i(t) - M(t))^2}{N}}$$

of the 10 signals $SP_i(t)$.

The terminal also calculates the average M'(t) and the standard deviation σ' (t) of the 10 derivative signals $SP'_i(t)$.

For each instant t, the terminal thus stores a quadruplet of reference signals [M(t), σ(t), M'(t), σ'(t)]. Such a biometric reference of the user thus allows to take account of a great variability of the user given by the different touches of each digit.

According to the particular embodiment of the development described here, the reference signal is represented by this quadruplet of reference signals. Two reference intervals are then defined from this quadruplet of reference signals. A first reference interval Int(t) is defined by Int(t)=[M(t)−σ(t)/2; M(t)+σ(t)/2] and a second interval Int'(t) of reference derivatives is defined by Int'(t)=[M'(t)−σ'(t)/2; M'(t)+σ'(t)/2]. During the subsequent authentication phase, the verification of the user's biometric reference will consist in verifying whether the signal received by the terminal is comprised within the first interval and whether the derivative signal of the signal received by the terminal is comprised within the second interval.

The quadruplet of reference signals [M(t), σ(t), M'(t), σ'(t)] or the reference intervals Int(t) and Int'(t) are stored in a memory, or database (5), either in the user's terminal, or in a database for pieces of authentication data, preferably with an identifier of the user (for example his name, his telephone number, the MAC address of his terminal, his bank account number, etc.).

The reference signals can typically be in the form of an analogue or digital signal, that is to say a function representing the variations of the signal corresponding to the touch of a digit by the user over a time interval, for example a few seconds. Preferably, these signals are of the square type.

Figure 5A:
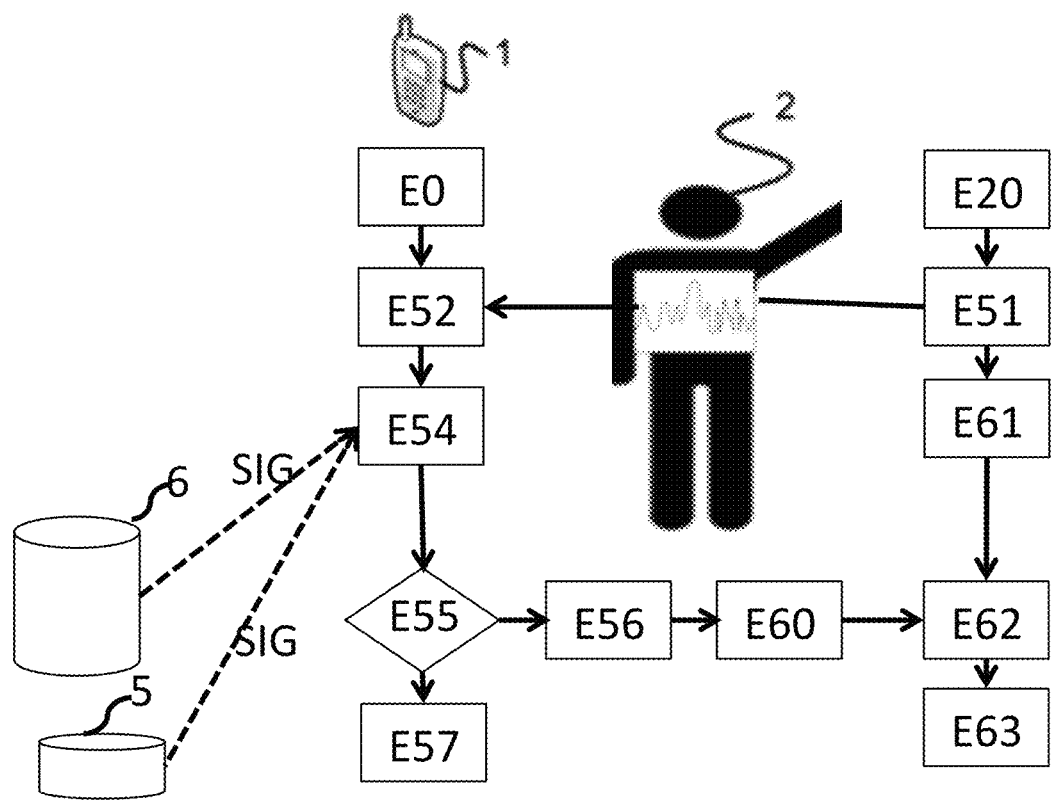
FIG. 5A shows the steps of a method for controlling an authentication according to one embodiment of the development.

FIG. 5A describes a method for controlling the authentication of a user according to a particular embodiment of the development.

It is assumed here, as well as previously, that all the requirements necessary for the CBB communication were carried out during the respective steps E0 and E20. It is also assumed that the learning phase described above in support of FIG. 4A was carried out and that the reference signal of the user is stored on the mobile terminal (it is recalled that the reference signal could be located elsewhere, in a database external to the terminal for example).

During a step E51, the user enters a code on an interaction interface of the authentication device. For example, it is assumed here that it is a 4-digit code, according to other exemplary embodiments, the code could include more or less digits, or other alphanumeric characters.

During step E51, communication is established on the CBB channel. The authentication device emits a signal which is modified by interaction of the user on the interface. The modified signal transmitted via the user's body and carrying the features of the user's interaction is received by the user's terminal (1) during a step E52. During step E52, the user's terminal demodulates and processes the received signal.

During a step E54, the user's terminal obtains the reference signal of the user from its memory or from an external database. In the example described here, the terminal retrieves the quadruplet of signals [M(t), σ(t), M'(t), σ'(t)] stored during the learning phase.

Figure 5B:
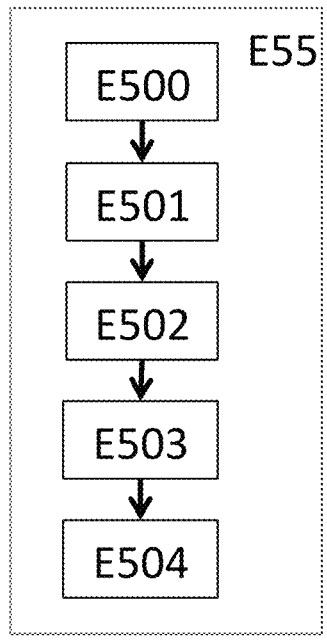
FIG. 5B illustrates the steps of the step of verifying that the radio signal corresponds to a reference signal, according to a particular embodiment of the development.

During a step E55, it is verified whether the received signal corresponds to the reference signal. Such verification is described below in relation to FIG. 5B.

During a step E500, the terminal identifies from the signal received during step E51 the 4 signals $SP_i(t)$ corresponding to the interaction of the user on each digit entering the code.

During a step E501, the terminal calculates the derivative signals $SP'_i(t)$ corresponding to the 4 signals $SP_i(t)$. The terminal will then verify whether the signals $SP_i(t)$ are comprised within the first reference interval Int(t) and whether the derivative signals $SP'_i(t)$ are comprised within the second reference interval Int'(t).

For this purpose, during a step E502, the terminal determines for each signal $SP_i(t)$ and $SP'_i(t)$, i ranging from 1 to 4, an indicator $I_i(t)$, respectively $I'_i(t)$, indicating whether the signal $SP_i(t)$, respectively $SP'_i(t)$, is comprised within the first reference interval Int(t), respectively within the second reference interval Int'(t). For this purpose, the terminal determines for each instant t comprised within the time interval during which the signal $SP_i(t)$ was received, whether the signal $SP_i(t)$ is comprised between the two functions M(t)−σ(t)/2 and M(t)+σ(t)/2, whether the signal $SP'_i(t)$ is comprised between the two functions M'(t)−σ'(t)/2 and M'(t)+σ(t)/2.

For example, the indicators $I_i(t)$ and $I'_i(t)$ are function of time t, and the indicator $I_i(t)$, respectively $I'_i(t)$, takes the value 0 when, at the instant t, the signal $SP_i(t)$, respectively $SP'_i(t)$, is comprised within the first interval Int(t), respectively within the second interval Int'(t), and the indicator takes the value 1 when the signal $SP_i(t)$, respectively $SP'_i(t)$, is not comprised within the first interval Int(t), respectively within the second interval Int'(t).

During a step E503, the terminal then calculates the distance between the signal generated during the interaction of the user to enter his code and the reference signal represented here by the quadruplet of reference signals. For this purpose, an indicator $I_i^g$ or $I_i'^g$ is obtained for each signal $SP_i(t)$ or $SP'_i(t)$ by summing over the time interval the indicators $I_i(t)$ and $I_i'^{(t)}$ previously obtained. Then, an overall distance is obtained by summing the 8 indicators $I_i^g$ and $I_i'^g$ obtained. Such a distance tends towards 0 when the user who entered the code corresponds to the user for whom the reference signals were learned.

During a step E504, the sum of the indicators is compared with a reference threshold S. When the sum of the indicators is less than the reference threshold, the verification is positive. Otherwise, the verification is negative.

According to a particular embodiment of the development, the reference threshold can vary according to a criterion of severity of the authentication. For example, when it comes to verifying the identity of the user during the validation of a monetary transaction carried out on the user's terminal, the threshold S may vary according to the amount of the transaction.

If the verification is positive, during a step E56, the identity of the user is validated.

During a step E60, the terminal transmits to the authentication device a piece of data representative of the identity of the user.

Otherwise, during a step E57, the verification of the identity of the user fails and no piece of identity data of the user is transmitted to the authentication device.

In parallel with the verification of the identity of the user by the terminal, during a step E61, the authentication device verifies that the code entered by the user corresponds to a predetermined code associated with the user. For example, it may be a confidential code stored on a physical medium inserted by the user into the authentication device. During a step E62, the authentication device receives the piece of data representative of the identity of the user transmitted by the terminal in step E60.

During a step E63, the authentication device verifies that the received identity corresponds to the identity associated with the predetermined code. For example, such an identity associated with the predetermined code is also stored on the physical medium.

When the code entered by the user corresponds to the predetermined code and the identity of the user received from the terminal corresponds to the identity associated with the predetermined code, the user is authenticated and can access the service, for example validating a transaction, accessing a secure place, etc.

Figure 6:
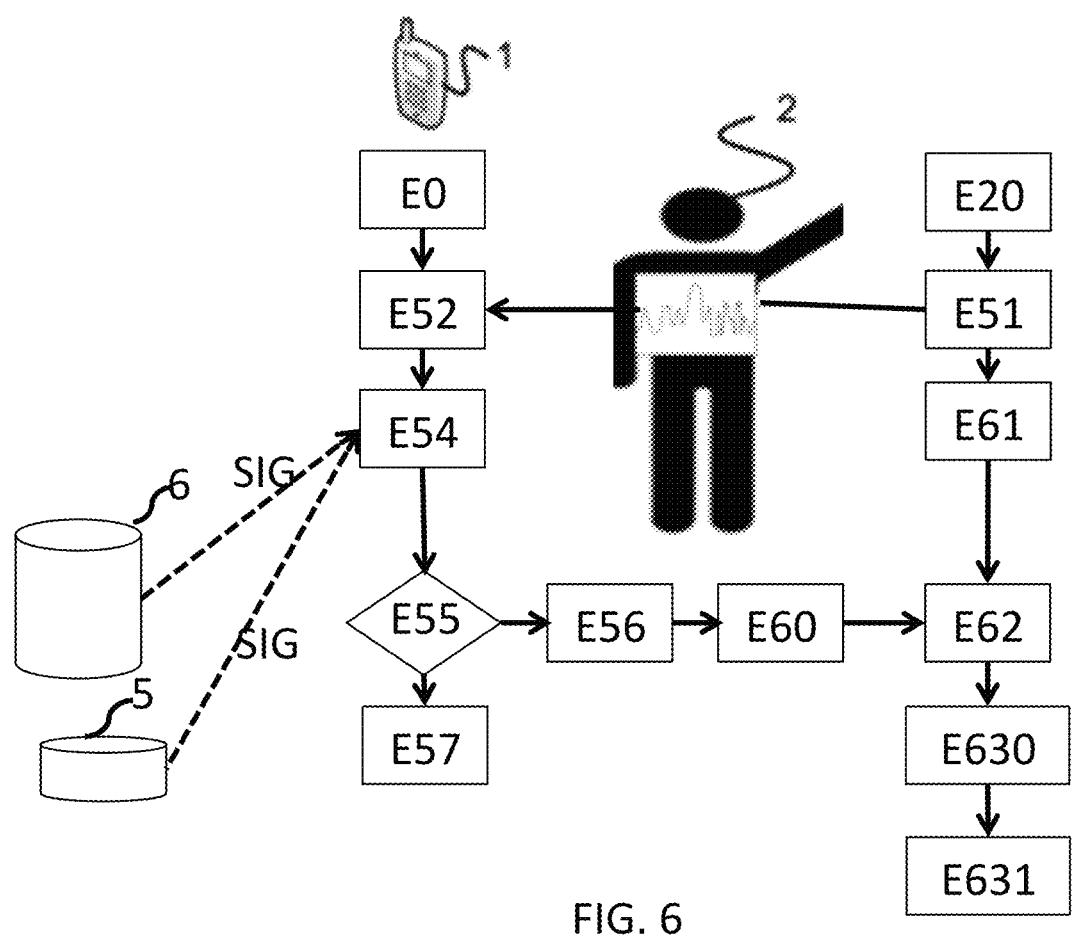
FIG. 6 shows the steps of a method for controlling an authentication according to another embodiment of the development.

FIG. 6 illustrates steps of the authentication control method and of the authentication method according to another particular embodiment of the development.

According to the embodiment described here, the step of verifying the identity of the user from the identity received from the terminal is performed by a control device (11).

Only step E63 described in relation to FIG. 5A is modified. During a step E630, the authentication device transmits to the control device the piece of data representative of the identity of the user received from the terminal, and a piece of identity data of the user associated with the predetermined code.

During step E631, the authentication device receives from the control device a signal validating the identity of the user when the two pieces of identity data correspond to the same user. Otherwise, the authentication device receives from the control device a signal indicating that the identity of the user is not validated.

To validate the identity of the user, for example, the control device verifies that the two pieces of identity data do indeed correspond to the same user. For example, the control device has a correspondence table comprising the name of the user, associated with his mobile number, or a customer account, or an integrated circuit card identifier, . . . .

According to a particular embodiment of the development, the authentication control method and the authentication method described in relation to FIG. 5A are implemented by the user's terminal. In this example, steps E20 and E61-E63 are then implemented by the terminal.

According to any one of the particular embodiments described here, when the reference signals of the user are stored in a set of user authentication data, an identifier of the user, for example a mobile number, his name, or another identifier, is used to select the reference signals specific to the user from the set of user authentication data. The user may have identified himself on the terminal beforehand, or else an identifier of the user may be requested by the terminal from the user via a terminal man-machine interface.

The invention claimed is:

1. A method for controlling the authentication of a user by an authentication device, implemented by a processor, the authentication of the user with the authentication device being implemented at least by a verification, by the authentication device, that a code entered by the user on an interaction interface of the authentication device corresponds to a predetermined code associated with the user, the authentication control method comprising:

receiving a signal representative of at least one radio signal characteristic of at least one interaction of the user on the interaction interface of the authentication device, the at least one radio signal being emitted by an antenna of the authentication device, to a terminal, via a channel using electromagnetic wave conduction capacities of the user's body when the user enters the code;

verifying that the at least one radio signal corresponds to a previously stored reference signal; and in the event of a positive verification, transmitting to the authentication device a piece of data representative of the identity of the user.

2. The method for controlling the authentication of a user according to claim 1, wherein the reference signal is represented by a quadruplet of previously stored reference signals, the verification that the at least one radio signal corresponds to a previously stored reference signal comprises:

obtaining a derivative signal of the at least one radio signal; and verifying that the at least one radio signal is comprised within a first reference interval determined from two reference signals of the quadruplet of reference signals, and that the derivative signal is comprised within a second reference interval determined from the other two reference signals of the quadruplet of reference signals.

3. The method for controlling the authentication of a user according to claim 2, wherein the verification that the at least one radio signal is comprised within a first reference interval determined from two reference signals of the quadruplet of reference signals, and that the derivative signal is comprised within a second reference interval determined from the other two reference signals of the quadruplet of reference signals, comprising:

determining, for each signal to be verified, an indicator indicating whether the signal is comprised within the first reference interval or within the second reference interval, the indicator taking the value zero (0) when the signal is comprised within the first reference interval or within the second reference interval and the indicator taking the value 1 when the signal is not comprised within the first reference interval or within the second reference interval;

calculating a sum of the indicators; and comparing the sum with a reference threshold, the verification being positive when the sum is less than the reference threshold.

4. The method for controlling the authentication of a user according to claim 3, wherein the reference threshold depends on a criterion of severity of the authentication.

5. The method for controlling the authentication of a user according to claim 2, wherein the interval of reference signals is obtained from an average and a standard deviation of radio signals characteristic of interactions of the user on an interaction interface of a device carried out during an initialization phase.

6. The method for controlling the authentication of a user according to claim 1, wherein the authentication device corresponds to the user's terminal.

7. The method for controlling the authentication of a user according to claim 1, wherein the reference signal is associated with an identifier of the user.

8. A non-transitory computer-readable medium, storing instructions of a computer program causing implementing the method for controlling the authentication of a user according to claim 1, when the program is executed by a processor.

9. A method for authenticating a user, implemented by an authentication device, the method comprising:

verifying that a code entered by the user on an interaction interface of the authentication device corresponds to a predetermined code associated with the user;

emitting a signal representative of at least one radio signal characteristic of at least one interaction of the user on the interaction interface of the authentication device, the radio signal being emitted by an antenna of the authentication device, to a terminal, via a channel using electromagnetic wave conduction capacities of the user's body when the user enters the code;

receiving a piece of data representative of the identity of the user from the terminal; and verifying that the identity of the user corresponds to an identity associated with the predetermined code associated with the user.

10. The method for authenticating a user according to claim 9, wherein the verification that the identity of the user corresponds to an identity associated with the predetermined code associated with the user comprises:

transmitting to a control device the piece of data representative of the identity of the user received and a second piece of data representative of the identity of the user, the second piece of data being associated with the predetermined code; and receiving a signal validating the identity of the user.

11. A non-transitory computer-readable medium, further comprising storing instructions of a computer program causing implementing the method for authenticating a user according to claim 9, when the program is executed by a processor.

12. A device for controlling the authentication of a user by an authentication device, the authentication of the user with the authentication device being implemented at least by a verification, by the authentication device, that a code entered by the user on an interaction interface of the authentication device corresponds to a predetermined code associated with the user, the authentication control device comprising at least a memory and a processor configured to:

receive a signal representative of at least one radio signal characteristic of at least one interaction of the user on the interaction interface of the authentication device, the radio signal being emitted by an antenna of the authentication device, to an authentication control device, via a channel using electromagnetic wave conduction capacities of the user's body when the user enters the code;

verify that the at least one radio signal corresponds to a previously stored reference signal; and in the event of a positive verification, transmit to the authentication device a piece of data representative of the identity of the user.

13. A terminal comprising an authentication control device according to claim 12.

14. The terminal according to claim 13 further comprising the authentication device.

15. An authentication device comprising a memory and a processor configured to:
- verify that a code entered by the user on an interaction interface of the authentication device corresponds to a predetermined code associated with the user;
- emit a signal representative of at least one radio signal characteristic of at least one interaction of the user on the interaction interface of the authentication device, the radio signal being emitted by an antenna of the authentication device, to a terminal, via a channel using electromagnetic wave conduction capacities of the user's body when the user enters the code;
- receive a piece of data representative of the identity of the user from the terminal; and
- verify that the identity of the user corresponds to an identity associated with the predetermined code associated with the user.

16. A payment terminal comprising an authentication device according to claim 15.

* * * * *